Oct. 29, 1940.  P. S. BALDWIN  2,219,610
FLUID PRESSURE TRANSMISSION
Filed Feb. 11, 1937  3 Sheets-Sheet 1
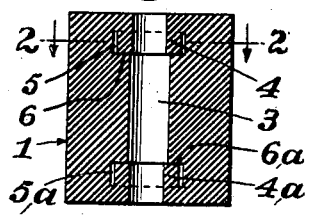
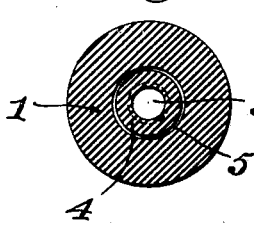
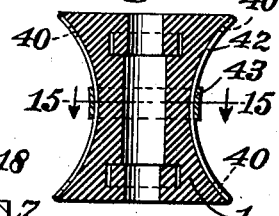
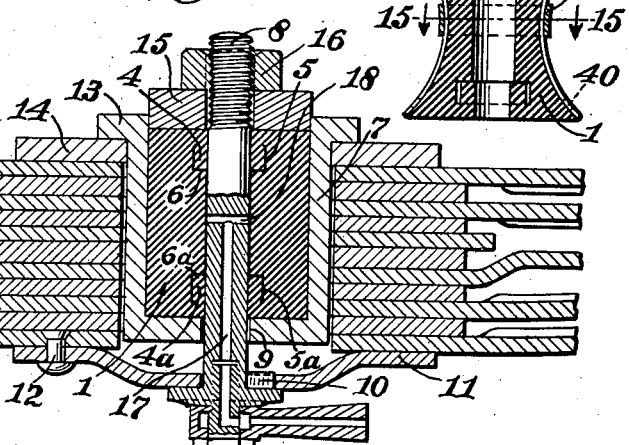
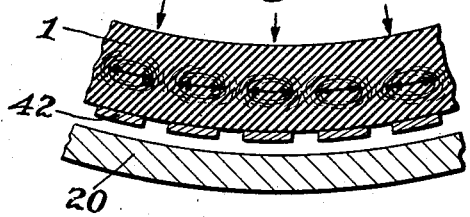
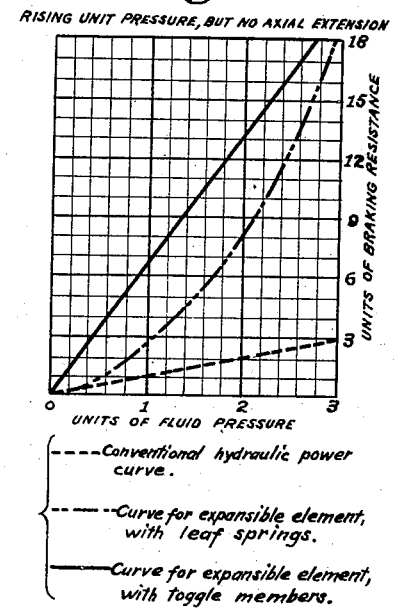
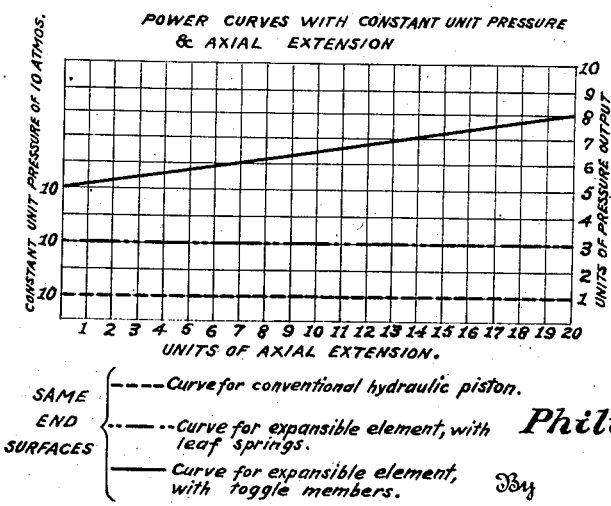
Inventor:
Philip Sidney Baldwin,
By
Attorneys.

Oct. 29, 1940. P. S. BALDWIN 2,219,610
FLUID PRESSURE TRANSMISSION
Filed Feb. 11, 1937 3 Sheets-Sheet 2
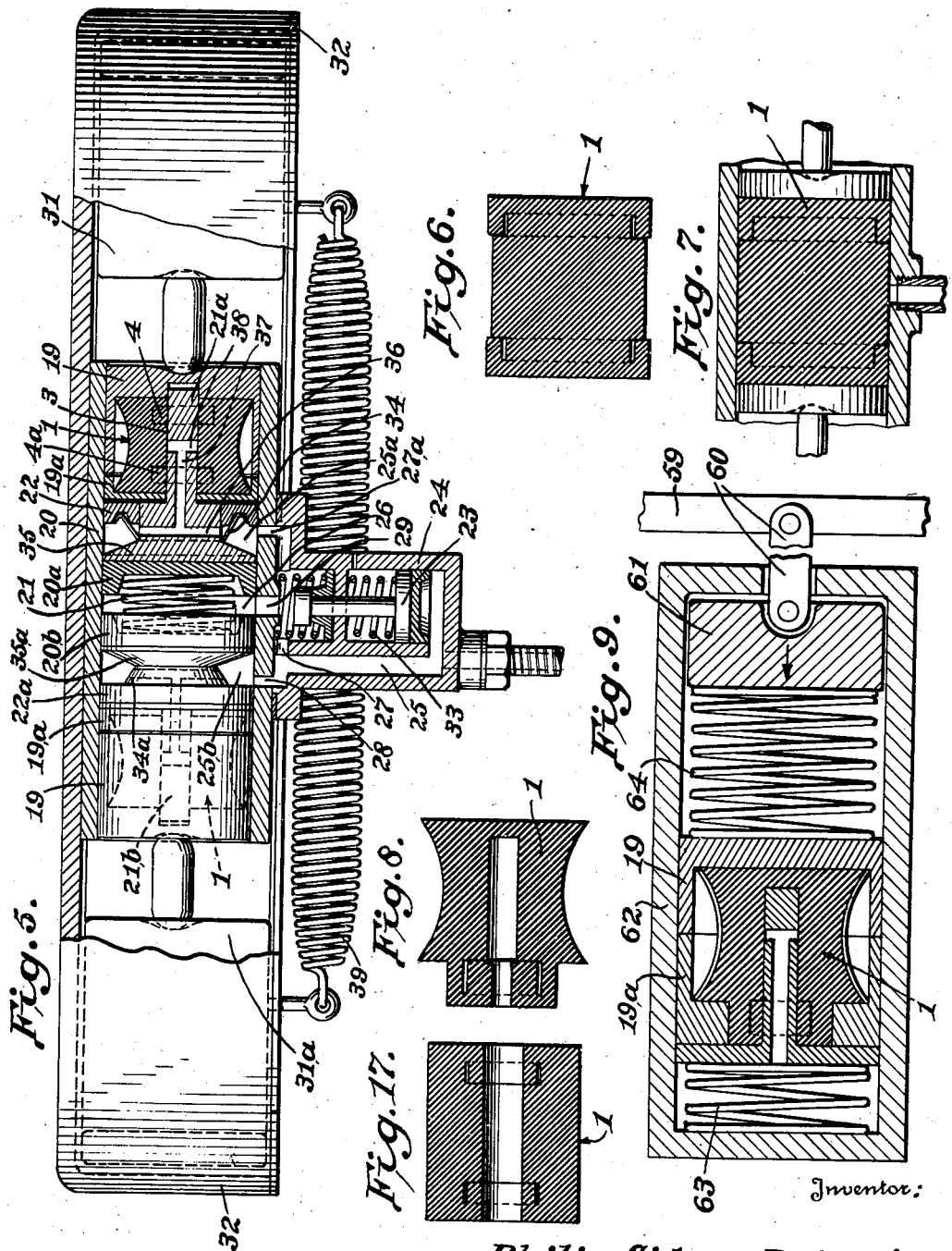
Inventor:
Philip Sidney Baldwin,
By
Attorney.

Oct. 29, 1940.　　　　P. S. BALDWIN　　　　2,219,610
FLUID PRESSURE TRANSMISSION
Filed Feb. 11, 1937　　　3 Sheets-Sheet 3
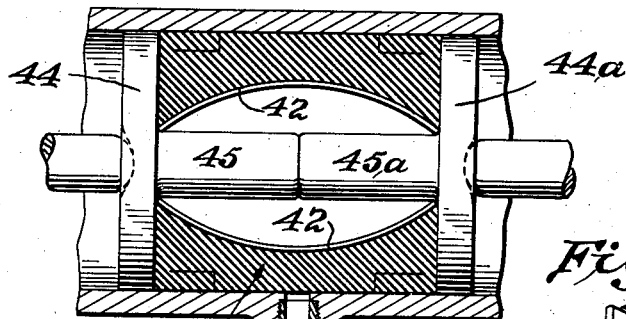
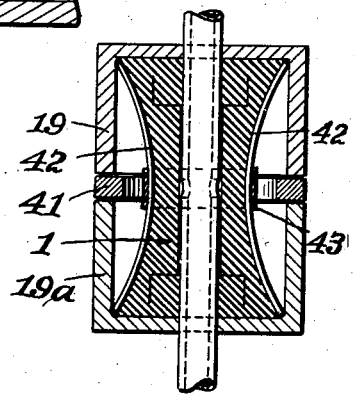
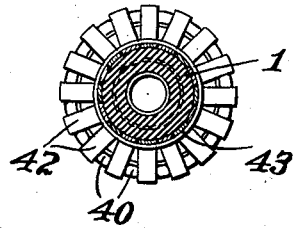
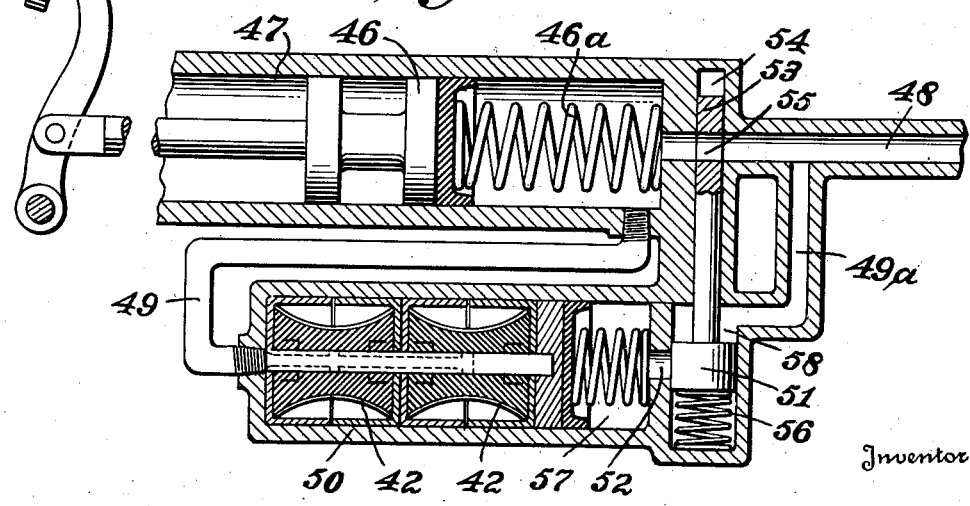
Inventor:
Philip Sidney Baldwin,
By Max Wall
Attorney.

Patented Oct. 29, 1940

2,219,610

UNITED STATES PATENT OFFICE 2,219,610

FLUID PRESSURE TRANSMISSION

Philip Sidney Baldwin, Florence, Italy

Application February 11, 1937, Serial No. 125,341

13 Claims. (Cl. 137—156)

This invention relates to improvements in an element for applying fluid pressure as set forth in my prior Patent No. 2,048,771, July 28, 1936, and comprises a new and improved form of element designed to be utilized for actuating presses, the frictional contact surfaces of brakes, clutches, shock absorbers and the like, and other apparatus requiring a powerful, efficient, dependable thrust such as is exerted by a hydraulic or pneumatic piston. The invention, by a reversal of its principle of operation for the uses described above, may also be used to act as a buffer in a recoil mechanism such as in a hydraulic recoil brake or in a heavy gun.

One of the objects of this invention is to provide an improved hydraulic element or agent in which fluid pressure, when exerted radially or axially on the walls of same when it is inserted in a cylinder, cup or other suitable container, may be converted through said element into a pressure or force acting substantially at right angles to the direction of the initial pressure on a given transmitting surface, and which, when suitable mechanical elements or levers are incorporated therewith, is capable of amplifying or supplementing by mechanical means the said longitudinal or axial hydraulic pressure output.

Another object is to provide an element which is so constructed that it may be subjected to and transmit, independently or in combination, fluid or mechanical pressure, each supplementing the other, and in inverse order.

Another object is to provide an apparatus which is small, compact, and with extremely few moving parts, which is economical to manufacture and which is very efficient in operation.

Another object is to provide an improved means for forming an effective and efficient fluid seal in a fluid pressure transmitting system.

Another object is to provide a means for sealing fluid under pressure when applied through the medium of a resilient, expansible and extensible element or piston which shall eliminate hollow spaces or air pockets in the hydraulic system where it is used, such air being highly objectionable because it is highly compressible and its presence causes lost motion in the pressure transmitting means. To this end I make use of an expansible and extensible element which completely fills the cylinder, cup or other suitable container through which fluid pressure is to be applied to the working part or parts, said fluid pressure being transmitted through the elastic mass of the element almost as if the same constituted a liquid of greater viscosity.

A further object is to provide an element which is designed to eliminate all surface friction between said element and its associated mechanical parts in the system.

Still a further object is to provide such an element or piston wherein all the fluid pressure, both radial and axial, is utilized. This will be recognized as a distinct improvement over the usual type of hydraulic piston wherein only the axial pressure, or pressure moving in the same direction that the piston moves, is effective for power transmission. Under static conditions, the rubber element transmits the same working pressure as a conventional piston of equal cross-section operating under fluid pressure, but at a slower rate of speed than when water, for example, constitutes the hydraulic medium. Rubber, in fact, to all intents and purposes, is as non-compressible as a true liquid and a pressure impulse may be transmitted through the rubber mass with the same intensity as through liquid, the rubber functioning as if it were a liquid of greater viscosity.

The all-rubber element may be used advantageously as an effective sealing means with elimination of air pockets when relatively high unit pressures are used with relatively low pressure output requirements. It might be considered as a fluid-controlled, substantially solid, elastic bushing or packing. The composite element, incorporating mechanical members such as leaf springs, articulated levers and the like, may be used to advantage where high working pressures are required with relatively low unit pressures and when a saving in space is a consideration. It may be regarded as a self-contained piston and cylinder combination in which all the pressure, both axial and radial, is put to work.

In the application of the principle of this invention to a hydraulic recoil brake or to a recoil buffer, the operation is reversed. Instead of transforming low radial pressures into high axial pressures on the top and bottom surfaces of the rubber element, high axial pressure on these surfaces are reduced through the action of the radially disposed curved leaf springs, as is hereinafter more fully disclosed.

The accomplishment of these and other objects will appear more fully from a consideration of the accompanying drawings and specification in which the invention is set forth for the purpose of illustrating and describing several embodiments thereof, although the invention is not to be construed as limited thereby.

In the drawings:

Figure 1 shows a central vertical sectional view through one form of the improved element;

Figure 2 is a horizontal sectional view thereof on line 2—2 of Figure 1;

Figure 3 shows one form of the improved element with spring members disposed about its body;

Figure 4 is a vertical sectional view of the all-rubber element incorporated in a friction shock absorber of the double arm oscillating type;

Figure 5 is a plan view, with parts broken away, showing another form of element incorporated in the wheel cylinder of a hydraulic brake;

Figure 6 is a central vertical sectional view of another form of element;

Figure 7 is a vertical sectional view of the element of Figure 6 shown compressed in a brake wheel cylinder;

Figure 8 is a central vertical sectional view of a further modified form of element;

Figure 9 is a central vertical sectional view of the element of Figure 8 operating in a buffer or recoil take-up arrangement which is shown in vertical section;

Figure 10 is a diagrammatical illustration of the action which takes place in the rubber when subjected to fluid pressure;

Figure 11 is a graphical representation of the difference in pressure output produced by a comparison of the conventional hydraulic power curve and that produced by the use of the expansible rubber element in combination with curved leaf spring members and articulated levers, respectively, operating on hydraulic end surfaces of equal cross-sectional area and when the same constant unit of fluid pressure is used, and the axial extension or power stroke is being accomplished.

Figure 12 is a graphical representation of the difference in pressure output produced by comparison of a conventional hydraulic power curve and that produced by the use of the expansible rubber element in combination with curved leaf spring members and articulated levers, respectively, operating on hydraulic end surfaces of equal cross-sectional area under static conditions (no stroke) and rising unit fluid pressure.

Figure 13 shows in vertical section a further modified form of element having curved leaf spring members within its body, the body being shown under mechanical pressure in a wheel cylinder;

Figure 14 shows in section, with parts in elevation, a master pump unit for an hydraulic braking system, with the rubber element of the invention, supplemented by curved leaf springs, used to effect the booster or high pressure braking stroke.

Figure 15 is a horizontal sectional view of Figure 3 on line 15—15, showing means for spacing the curved springs or lever members around the body of the element.

Figure 16 shows in vertical section the rubber element with curved leaf springs in the separable cups which normally contain the rubber element in a hydraulic system, and shows means for limiting the radial movement of the spring members.

Figure 17 shows in vertical section a form of the element in which the lips of the body are not offset therefrom.

The device as shown in Figure 1 comprises an expansible and extensible element 1, preferably of rubber, having a central bore 3 which extends completely therethrough. The wall of this bore 3 has a pair of lips 4, 4a, annular in form, adjacent the end walls of the body and normally offset from the wall of the bore. Annular fluid receiving pockets or spaces 5, 5a are provided within the body of the element and passageways 6, 6a connect said pockets with the bore 3. The offset portion of the lips 4, 4a are of a width and depth substantially equal to the width and depth of the spaces 5, 5a part of which spaces are occupied by said lips. The element is shown in a modified form with mechanical, pressure-supplementing members associated therewith in Figure 3.

As shown in Figure 4, the element 1 is associated with a friction shock absorber of the double-arm oscillating type and is disposed in a cup or container 7. The element 1 completely fills the container 7 and is transfixed through its axis by a bolt 8, the container having an opening 9 at one end to admit said bolt. The diameter of the bolt 8 is greater than the diameter of the bore along the line 2—2 of Figure 1 and when forced past the lips 4 and 4a it stretches them and causes them to become initially tensioned so as to press tightly around the surface of the bolt. By reason of this stretching, the rubber mass of these normally offset lips is extended into and completely fills the spaces or pockets 5, 5a, eliminating all possible hollow air spaces or pockets.

In the head of the bolt 8, a tooth or projection 10 is provided which fits into a correspondingly shaped notch in the thrust plate 11 to lock the bolt against rotation with respect thereto, the thrust plate 11 being suitably fixed to an arm of the shock absorber by rivet 12. The container 7, at its open end, has a flange 13 which rests upon a face plate 14, frictionally engaging another arm of the shock absorber. The bolt 8 is provided with a sliding washer 15 and a retaining nut 16, the washer being adapted to move axially in the container along the bolt under the influence of the nut 16, which may be used to place the element under initial, axial, mechanical pressure.

In operation, the shock absorber might be controlled by a suitable pressure pump (not shown) accessibly located with respect to the driver of a vehicle (not shown) to transmit fluid pressure to the element by means of a suitable conduit. Pressure exerted at the pump is transmitted to a suitable fluid in the system which then flows to the bolt through the conducting means, the bolt having suitable inlet fittings and being bored axially at 17 and radially at 18. The fluid enters the passageway 17 and 18 then flows axially between the bolt and the body of the element until it reaches the passageways 6, 6a leading to the fluid receiving spaces 5, 5a. The stretching of the lips 4, 4a around the bolt 8 makes the contact pressure between the lips and the bolt greater than the contact pressure between the surfaces of the bolt and the remaining portion of the wall of the bore of the element on one hand, and between the contiguous surfaces of the said lips and the body of the element on the other, since the lips now occupy the space of the pockets. The fluid pressure entering the system, therefore, follows the line of least resistance and flows along the wall of the bore into the passageways 6, 6a and thence into the spaces 5, 5a between the lips and the contiguous walls of the body of the element.

The fluid under pressure now exerts its force radially against the body of the element and against the lips 4, 4a, additionally pressing the latter against the bolt 8 and forming a completely effective fluid seal. It will be obvious that the element combined with leaf springs shown in Figure 3 might be substituted for the element 1 in Figure 4. Since the rubber element 1 completely fills the container 7, the fluid under pressure presses the rubber radially against the walls of the container and this results in an axial expansion or extension of the rubber mass along the bolt and container walls. The fluid entering the body of the element expands and extends the same creating a fluid chamber, and fluid pressure within that chamber takes effect directly on the end surfaces thereof.

If, however, pressure is exerted on a non-compressible, rigid body, the rubber element cannot expand and extend, and rubber being practically non-compressible, the fluid pressure is transmitted through the rubber mass from point of application as if the rubber were a liquid. More fluid cannot then enter the rubber element to form a chamber or pocket. This is what is known as static condition. No fluid pressure can now be exerted directly on the end surfaces of the element, but only indirectly through the walls thereof.

The thrust resulting from this expansion and extension is transmitted to the sliding washer 15 and nut 16, thereby forcing the flange 13 of the container against the face plate 14 and compressing the friction pack of the shock absorber between the face plate 14 and the thrust plate 11, the degree of compression being controlled at the pump by the operator. By this means it will be seen that the operator of a vehicle embodying this invention will have under his control an apparatus for immediately adjusting his shock absorbers to given road conditions, the flexibility of the control allowing an adjustment to compensate for such factors as the speed or weight of the car over the given road conditions.

As shown in Figure 5, the element is incorporated in the wheel cylinder of a hydraulic brake mechanism. As the mechanism is duplicated in both ends of the cylinder, a description of one end will suffice. The elements 1, which may be called pistons, are disposed in separable containers having two parts 19, 19a, oppositely disposed, which when united as shown in the drawings form a closed casing for the rubber elements 1, and are adapted to be separated under the axial extension thereof.

The containers 19, 19a in two complete units are positioned in the wheel cylinders 20, to act as guides for the rubber elements in the cylinder. Between these units sliding cup members or sealing rings 20a, 20b are retained in spaced relation by suitable means such as spring 21, fixed at each end to these rings which function to seal the fluid introduced into the chamber 26. Thrust members 35, 35a are provided with skirt members 34, 34a which bear against the sealing collars or rings 22, 22a in such a manner as to urge them against the walls of the cylinder to prevent escape of fluid along the walls thereof. The body of these thrust members have reduced stems as at 21a, 21b which project through an opening in the container 19 and into the bore 3 of the element 1. These thrust members are bored radially as at 36 to communicate with axial and radial bores 37, 38, respectively, in the extension members, which in turn communicate with the bore of the rubber element. The expansible elements 1 are mounted with respect to the stems in a manner similar to that hereinbefore described, with the sealing lips 4, 4a stretched around the tube to form an initial fluid seal.

By depressing a brake pedal (not shown) and through the medium of a master pump (not shown), fluid under pressure is forced up to the base of the valve 23 in the casing 24 forming part of the brake wheel cylinder. The fluid flows simultaneously through the by-pass 25 to chambers 25a, 25b, and 26 through suitable ports 27, 27a and 28 and 29, respectively.

Since the members 20a and 20b are of greater diameter than the rubber elements 1, 1a in the cylinder, when fluid enters the chamber 26 it forces these members 20a, 20b apart. The leaf springs associated with the rubber elements are calculated to resist radial pressure in the rubber element below the pressure required to bring the shoes into contact with the drums against the tension of the return spring 21. The oppositely disposed units move away from each other, and press the brake shoes 31, 31a against the brake drum 32 in a manner similar to that wherein opposed pistons are utilized in a hydraulic braking system. The valve 23 tends continuously to be urged towards the inlet port 29 against the counteracting influence of the spring 33 until a predetermined pressure is reached which is sufficient to overcome the force of the spring 33, when the valve 23 will move to close the inlet port 29 forming a closed fluid pressure circuit within the chamber 26. The liquid in the chamber 26 thereby offers a non-compressible base to the oppositely disposed units. The ports 27a, 28 remaining open, the fluid under sustained pressure at the same time will flow into chambers 25a and 25b, respectively, and into the expansible elements through the bores as hereinbefore described, effectively pressing the sealing lips 4, 4a against the tube and then expanding the rubber elements radially and axially as described to contribute an equalized, smooth and powerful thrust against the brake shoes with which they are already in contact.

Upon release of the brake pedal, and pressure in the system, the curved leaf springs around the body of the elements will return to their original camber, and in so doing will force the fluid out of these elements and return it to the master pump; the spring 33 will return the valve 23 and open the port 29, and the rubber elements together with containers, collars and cup members and brake shoes will be retracted by the return spring 39, thereby forcing the fluid out of chamber 26.

The valve 23 is provided with suitable packing or sealing washers where necessary to seal the fluid in the casing 24.

In the modification of the element shown in Figure 6, the sealing lips are formed on the outer surface of the body. In this form of the invention, the lips are pressed into contact with the body of the element and compressed when it is inserted in the cylinder or container where it is to be used. The fluid flows along the wall of the element until it reaches the sealing portion formed by the lips which are initially pressed against the container walls. The fluid flows behind the lips and presses them into sealing engagement with the cylinder or container walls. The fluid, always under pressure, then acts upon the body of the element to work in a manner heretofore described.

In Figure 8 only one sealing lip is shown formed within the body, the bore thereof not extending entirely therethrough as shown in Figures 1 and 3.

In the application of the principle of this invention to a hydraulic recoil brake or to any recoil buffer, as illustrated, for example, in Figure 9, the operation is reversed. Instead of transforming low radial pressures into high axial pressures on the end surfaces, high axial pressures on these end surfaces are reduced through the action of the radially disposed curved leaf springs.

In its application to a heavy gun recoil, for example, its function is to cushion the high pressure set up in the first cycle of the recoil stroke when the reaction is the most violent. It cooperates with and supplements the action of the recoil piston of the regular hydraulic braking or cushioning system, but does not replace these pistons or interfere with their normal function. It interposes a yielding, flexible cushioning action during the compression stroke which increases progressively in intensity and then subsides progressively as the recoil pressure subsides. In other words, it robs the recoil of much of its initial shock.

In the operation of the device as shown in Figure 9, the member 59 might be the chassis of an automobile, or a movable member of some other apparatus subject to sharp, violent movement. A conventional link member 60, or any suitable linking system connects this member with a movable piston 61 in the cylinder 62. The bottom of this cylinder is filled with fluid, and a spring 63 is supported thereon, and, in turn, normally supports the unit of the rubber element 1, in its containers 19, 19a, in spaced relation to the bottom of the cylinder. Should violent movement occur to force the member 59 downwardly, this motion would be transmitted through the link 60, piston 61, spring 64 to the containers 19, 19a, forcing them downwardly with resultant high pressure in the bottom of the cylinder. Fluid is forced into the rubber element in a manner heretofore described and this flow is resisted radially by the curved leaf springs which surround the rubber element. When the continued pressure rises above a given limit, the leaf springs begin to give and offer a progressively increasing resistance to the passage of the fluid into the element 1. The springs, under the action of the fluid pressure, are pressed radially and extended axially until they are completely straightened out. The whole action here described takes place very quickly and results in a progressively increasing, dampening action.

Upon completion of the downward stroke, the pressure decreases and the leaf springs tend to return to their normal camber, gradually discharging the fluid content of the element. The springs now contribute a progressively decreasing dampening action and the stroke cycle is completed. The element 1 is now inoperative and the unit is return to normal position by the spring 63.

The degree of dampening action obtainable by this means may be varied by varying the stiffness and camber of the leaf springs. It will be obvious that more than one unit may be used by substituting the type of element shown in Figures 3 and 14. In such case, the degree of dampening action may be varied not only by varying the stiffness and camber of the springs, but by using springs of varying capacity and strength. In the various units, and these units may be so arranged that they come into action progressively, one after the other.

The form of element shown in Figure 13 discloses a modification in which the curved leaf springs are disposed within the body thereof. This element is inserted in a cylinder and the heads 44, 44a, which are provided with integral bosses or studs 45, 45a, respectively, project into the element 1 and act as stops to prevent undue axial depression of the springs 42 under axial, mechanical pressure.

Figure 14 shows a master pump for a hydraulic braking system, with the rubber element of this invention incorporated for the purpose of illustrating its operation in this combination.

The system being filled with fluid, pressure on the brake pedal will cause the piston 46 to move forwardly in the cylinder 47 forcing fluid into the pipe line 48 leading to the wheel cylinder to bring the brakes into engagement with the drum, and at the same time fluid will flow around by-pass 49 into the rubber elements disposed in their containers in the cylinder 50 in a manner previously fully described and around a by-pass 49a to the top of valve 51. At right angles to the axes of the cylinders 47, 50, and at one end thereof is a valve member 51 working in a cylinder in communication with cylinder 50 through port 52. This valve 51 has a reduced stem 53 which slides in a bore 54 in the body of the pump, and this stem has a port 55 establishing communication between the cylinder 47 and pipe line 48. The port 52 is normally kept closed and the port 55 is normally kept open by means of a spring 56 which supports the valve 51 in this position. The initial pressure exerted by the piston forces fluid to the wheel cylinders through pipe line 48 and actuates the opposed pistons in said cylinders to bring the brake shoes into engagement with the drums. When the pressure of the fluid in the system on top of valve 51 reaches a degree sufficient to overcome the tension of spring 56, valve 51 will move downwardly, opening port 52 and simultaneously closing port 55.

During the initial compression stroke, liquid in the compression chamber 57 is kept in closed circuit until released by downward movement of valve 51, and fluid pressure in the rubber elements cannot extend them radially and axially against the trapped liquid in the compression chamber until said liquid is released through port 52. During the initial stroke, therefore, the rubber elements and the radially disposed springs 42 are kept in static condition, but exert pressure on the trapped liquid in chamber 57. When communication is established between chamber 57 and the wheel cylinder circuit through the opening of port 52, the rubber elements and associated springs extend radially and axially as heretofore described under continued pressure by piston 46 and exert the high pressure stroke on the brake shoes.

Upon release of the brake pedal, spring 46a returns piston 46 to its normal position. The springs 42 return to their normal camber and evacuate the fluid in the rubber elements. Piston 51 is returned to normal closed position by spring 56.

It may be desirable to provide some means for spacing the springs or lever members around the body of the element, and in such event teats or projections 40 may be molded around the body at spaced points at each end thereof as shown in Figure 15. Instead of these teats it will be obvious that the external, cylindrical wall of the body may be fluted during the molding process to accommodate these members, and other suitable means may be devised to accomplish this object.

In Figure 16 is shown a ring or stop washer 41 disposed between the cups 19, 19a, which may be used to stop radial movement of the spring members 42 beyond their effective range for purposes of an axial or longitudinal stroke. A band 43, of rubber or other suitable material, is shown supporting the spring members about the element 1.

It is characteristic of the rubber element that the fluid pocket and sealing lips are disposed concentrically therein and in a plane substantially perpendicular to the plane of initial fluid pressure transmission. With this arrangement the fluid under pressure is automatically sealed even when the element is subjected to pressure mechanically in an axial direction in its container, and the sealing surfaces are thereby pressed strongly together through the axial contraction and consequent radial expansion of the rubber mass.

Provided that the rubber walls of the element intervening between the fluid under pressure and the mechanical members are sufficiently thick in relation to the width of the spaces between these members disposed radially about the element, the rubber does not advance beyond the surface of the mechanical members in contact with the rubber, that is, the rubber does not squeeze out between these spring members, as might be supposed. The fluid displacement required to effect a power stroke is thus limited to the radial and axial distension of the rubber element within the confining sheath of the mechanical elements.

This feature is due to the fact that when pressure is applied to the resilient walls they adhere to the metal parts at points of contact and tend to spread away laterally from the source of pressure as the resistance set up by the mechanical elements to radial advance is encountered. In so doing, contrasting pressures are set up in the elastic mass causing a condensation of the rubber so to speak, in the wall which builds up resistance to the advance of the rubber through the spaces between the mechanical elements; the resistance being proportional to the ratio between the thickness of the walls and the area of the contacting surface presented by the wall of the spring elements which form a mechanical sheath around the element. The width of the spaces may obviously be decreased proportionately by decreasing the width of the mechanical elements and by augmenting their number. The resistance of the rubber to radial advance and the contrasting pressures set up therein are diagrammatically illustrated in Figure 10.

There is no surface friction between the rubber and metal parts at points of contact within the power stroke limit of the device provided that the walls of the element are sufficiently thick. All reciprocal movements between the rubber and metal parts are absorbed by the deformation or distortion of the elastic mass, the rubber flowing or rolling over the metal surfaces as it accommodates itself to radial and axial distension.

It will be obvious that the mechanical elements such as leaf springs, toggles, levers or the like, may or may not be used in conjunction with the rubber element, but that the pressure or power output will be greatly augmented where they are used, reference being made to the graphs illustrated in Figures 11 and 12. It will also be obvious that these mechanical members may be disposed around the expansible element or imbedded or otherwise disposed in the body thereof as taught in my prior patent above referred to. The pressure output, however, will vary with the type of mechanical members used.

When articulated levers are used, the axial thrust as they are straightened out under radial fluid pressure will increase progressively with the extension stroke, at constant unit pressures.

When curved leaf springs of a given camber are used their pressure output under radial fluid pressure will be constant for the whole extension stroke at constant unit pressure. This feataure is due to the inherent resistance of the spring arcs to being depressed, resistance which increases progressively with their extension, and which neutralizes the mechanical advantage which might be expected to result from such extension. It insures equalized pressure in a hydraulic braking system, for example, where several elements are used working with unequal axial extension.

In the graph shown in Figure 11 a comparison is made of the curves produced by the use of the rubber element alone, and when used in conjunction with curved leaf springs and toggle members.

Where curved leaf springs are used working from a fixed camber outward, the mechanical pressure output by the springs under radial fluid pressure increases progressively over the direct fluid pressure on the end surfaces with the increase in the unit pressure independently of their axial extension. This feature is not to be confused with the progressive increase in axial thrust by the articulated levers with their extension. It is due to the variation in the ratio between the pressure output by the springs under radial fluid pressure and the direct fluid pressure on the end surfaces under varying fluid unit pressures, because of the factor of resistance of the springs to radial depression.

Thus, if the factor of resistance to radial depression of a given curved leaf spring with a radial surface of ½ square inch, is 50 lbs. pressure per square inch, and the potential axial thrust of the spring through mechanical advantage is twice the fluid pressure on its radial surface, then at 50 lbs. fluid pressure it will contribute no axial mechanical thrust; at 100 lbs. pressure it will contribute 50 lbs.; at 150 lbs., 100 lbs., and so on throughout the total fluid pressure range. That is, a rubber element with an end surface of 1.25 square inches and 8 springs as above, would deliver as axial thrust 61.5 lbs. at 50 lbs. pressure, or the equivalent of the fluid pressure on the end surface, whereas at 350 lbs. pressure there would be a combined pressure output of 2829.3 lbs. or 6.5 times the direct fluid pressure on the end surface, and this, as already stated, regardless of the axial extension of the springs. In other words, in a fluid pressure range of 50 lbs. to 350 lbs., the pressure output will increase progressively from zero to 6.5 times the fluid pressure on the end surface. Obviously the rate of progression may be made to vary by varying the stiffness of the springs on the one hand, and the camber on the other.

Figure 12 illustrates the curve of the rubber element alone as contrasted with the curves of the rubber element used in conjunction with curved leaf springs and articulated levers when the end surfaces are equal and when there is no axial extension (static condition).

Having thus described my invention, what I claim is:

1. A pressure responsive device comprising a resilient, expansible body having a wall with at least one portion thereof constructed and arranged to seal against a co-operating member under the action of fluid under pressure applied thereto, said portion consisting of a fluid-sealing lip which is normally offset from said wall, but which is put under initial stress and forms a continuation of said wall when in contact with said co-operating member, said body having a fluid receiving space behind said lip and a passageway therein for conducting fluid under pressure to said space, whereby the pressure of said lip against said co-operating member is increased by the pressure of the fluid.

2. A pressure responsive device comprising a resilient, expansible body having a wall with at least one portion thereof constructed and arranged to seal against a co-operating member under the action of fluid under pressure applied thereto, said portion consisting of an annular fluid sealing lip which is normally offset from said wall, but which is put under initial stress and forms a continuation of said wall when in contact with said co-operating member, said body having a fluid receiving space behind said lip and a passageway therein for conducting fluid under pressure to said space, whereby the pressure of said lip against said co-operating member is increased by the pressure of the fluid.

3. A pressure responsive device comprising a resilient, expansible body having a wall with at least one portion thereof constructed and arranged to seal against a co-operating member under the action of fluid under pressure applied thereto, said portion consisting of a fluid sealing lip which is normally offset from said wall, but which is put under initial stress and forms a continuation of said wall when in contact with said cooperating member, said body having a fluid receiving space behind said lip for receiving fluid under pressure, whereby the pressure of said lip against said co-operating member is increased by the pressure of the fluid.

4. A pressure responsive device comprising a resilient, expansible body having a wall with portions thereof constructed and arranged to seal against a co-operating member under the action of fluid under pressure applied thereto, said portions consisting of spaced fluid sealing lips which are normally offset from said wall, but which are put under initial stress and form a continuation of said wall when in contact with said co-operating member, said body having a receiving space behind each lip and a passageway therein for conducting fluid under pressure to each space, whereby the pressure of said lips against said cooperating member is increased by the pressure of the fluid.

5. A pressure responsive device comprising a resilient expansible body having a bore therein, the wall of said bore having at least one portion thereof constructed and arranged to seal against a co-operating member under the action of fluid under pressure applied thereto, said portion consisting of a fluid sealing lip which is normally offset from the wall of said bore, but which is put under initial stress and forms a continuation of said bore when in contact with said co-operating member, said body having a fluid receiving space behind said lip and a passageway therein for conducting fluid under pressure to said space.

6. A pressure responsive device comprising a resilient, expansible block having an external peripheral wall with at least one portion thereof constructed and arranged to seal against a co-operating member under the action of fluid under pressure applied thereto, said portion consisting of a fluid sealing lip which is normally offset from said wall, but which is put under initial stress and forms a continuation of said wall when in contact with said co-operating member, said body having a fluid receiving space behind said lip and a passageway for conducting fluid under pressure to said space, whereby the pressure of said lip against said co-operating member is increased by the pressure of the fluid.

7. A pressure responsive device comprising a resilient, expansible body having a bore therein, said bore being closed at one end, the wall of said bore having at least one portion thereof constructed and arranged to seal against a co-operating member under the action of fluid under pressure applied thereto, said portion consisting of a fluid sealing lip which is normally offset from the wall of said bore, but which is put under initial stress and forms a continuation of said bore when in contact with said co-operating member, said body having a fluid receiving space behind said lip and a passageway therein for conducting fluid under pressure to said space.

8. A pressure responsive device comprising a resilient, expansible body having a wall with at least one portion thereof constructed and arranged to seal against a co-operating member under the action of fluid under pressure applied thereto, said portion consisting of a fluid-sealing lip which is normally offset from said wall, but which is put under initial stress and forms a continuation of said wall when in contact with said co-operating member said body having a fluid receiving space behind said lip and a passageway therein for conducting fluid under pressure to said space, whereby the pressure of said lip against said co-operating member is increased by the pressure of the fluid, levers disposed about the outer wall of said body and conforming to the contour thereof, and means for spacing said levers about said body.

9. A pressure responsive device comprising a resilient, expansible body having a wall with at least one portion thereof constructed and arranged to seal against a co-operating member under the action of fluid under pressure applied thereto, said portion consisting of a fluid-sealing lip which is normally offset from said wall, but which is put under initial stress and forms a continuation of said wall when in contact with said co-operating member, said body having a fluid receiving space behind said lip and a passageway therein for conducting fluid under pressure to said space, whereby the pressure of said lip against said co-operating member is increased by the pressure of the fluid, levers disposed about the outer wall of said body and conforming to the contour thereof, and spaced projections on said body for spacing said levers about said body.

10. A pressure responsive device comprising a resilient, expansible body having a wall with at least one portion thereof constructed and arranged to seal against a co-operating member under the action of fluid under pressure applied thereto, said portion consisting of a fluid-sealing lip which is normally offset from said wall, but which is put under initial stress and forms a continuation of said wall when in contact with said co-operating member, said body having a fluid receiving space behind said lip and a passageway therein for conducting fluid under pressure to said space, whereby the pressure of said lip against said co-operating member is increased by the pressure of the fluid, levers disposed about said body and conforming to the contour thereof, and means for supporting said levers on said body.

11. A pressure responsive device comprising a resilient expansible body having a wall with at least one portion thereof constructed and arranged to seal against a co-operating member under the action of fluid under pressure applied thereto, said portion consisting of a fluid-sealing lip which is normally off-set from said wall, but which is put under initial stress and forms a continuation of said wall when in contact with said co-operating member, said body having a fluid receiving space behind said lip and a passageway therein for conducting fluid under pressure to said space, whereby the pressure of said lip against said co-operating member is increased by the pressure of the fluid, levers disposed about said body, spaced projections on said body for spacing said levers, and means for supporting said levers about said body.

12. In combination, a pressure responsive device comprising a resilient, expansible body and a rigid casing therefor, the peripheral wall of said body having spaced fluid sealing lips constructed and arranged to seal against the casing under the action of fluid under pressure applied thereto, said lips normally offset from said wall, but being put under initial stress and forming a continuation of said wall when inserted in said casing, said body having a fluid receiving space behind each lip and a passageway therein for conducting fluid under pressure from said wall to said space, the casing having means disposed between said spaced lips for introducing fluid under pressure thereto, whereby the pressure of said lips against said casing is increased by the pressure of the fluid.

13. A pressure responsive device comprising a rigid cylinder and a resilient, expansible body in said cylinder, a movable head in said cylinder arranged at each end of said expansible body, the peripheral wall of said body having spaced fluid receiving lips constructed and arranged to seal against the cylinder under the action of fluid under pressure applied thereto, said lips being put under initial stress against the wall of said cylinder, said body having a fluid receiving space behind each lip and a passageway therein for conducting fluid under pressure from said wall to said space, the cylinder having means disposed between said spaced lips for introducing fluid under pressure thereto, said resilient body having a piston head equal to that of a rigid conventional hydraulic piston of the same cross-sectional area, said body when subjected to the force exerted thereon by fluid at a predetermined unit pressure, yielding a pressure output against said movable heads of the order of at least from one to eight times the pressure output yieldable by a conventional hydraulic piston acting under the same unit pressure.

PHILIP SIDNEY BALDWIN.